United States Patent
Wiseman et al.

(10) Patent No.: US 6,676,333 B2
(45) Date of Patent: Jan. 13, 2004

(54) FRAME MEMBERS FOR A PORTABLE DAM

(75) Inventors: Herb Wiseman, Affton, MO (US); Richard D. Ruiz, Des Peres, MO (US); Robert J. McCann, O'Fallon, MO (US); Troy Dean Ruiz, St. Louis, MO (US); Scott Allen Ruiz, Kirkwood, MO (US)

(73) Assignee: Richard D. Ruiz, LLC, St. Louis, MO (US)

( * ) Notice: Subject to any disclaimer, the term of this patent is extended or adjusted under 35 U.S.C. 154(b) by 0 days.

(21) Appl. No.: 10/079,016

(22) Filed: Feb. 19, 2002

(65) Prior Publication Data

US 2003/0156903 A1 Aug. 21, 2003

(51) Int. Cl.$^7$ ................................................. E02B 7/08
(52) U.S. Cl. ........................ 405/114; 405/102; 405/107; 405/29; 52/71
(58) Field of Search ........................... 405/91, 107, 114, 405/115, 15, 29, 32, 102, 288; 248/165–171, 163.1, 434, 435; 52/71, 169.4; 135/131, 132, 906, 121, 122, 128

(56) References Cited

U.S. PATENT DOCUMENTS

| | | | | | |
|---|---|---|---|---|---|
| 2,723,817 | A | * | 11/1955 | Harwood et al. | 248/166 |
| 2,806,477 | A | * | 9/1957 | Fritsche | 135/132 |
| 3,356,330 | A | * | 12/1967 | Rambelle | 248/354.5 |
| 3,383,080 | A | * | 5/1968 | Frisbie | 248/235 |
| 3,563,257 | A | * | 2/1971 | Cummins | 52/71 |
| 3,814,150 | A | * | 6/1974 | Gower | 248/94 |
| 4,136,995 | A | | 1/1979 | Fish | |
| 4,276,726 | A | * | 7/1981 | Derus | 248/432 |
| 4,318,635 | A | * | 3/1982 | Gurtner et al. | 405/288 |
| 4,511,286 | A | | 4/1985 | Hardacre | |
| 4,692,060 | A | * | 9/1987 | Jackson, III | 405/115 |
| 4,908,999 | A | * | 3/1990 | Harris | 248/354.5 |
| 4,921,373 | A | * | 5/1990 | Coffey | 405/115 |
| 4,970,841 | A | * | 11/1990 | Zeigler | 52/646 |
| 5,470,177 | A | | 11/1995 | Hughes | |
| 6,079,904 | A | | 6/2000 | Trisl | |
| 6,132,140 | A | | 10/2000 | Kullberg | |
| 6,334,738 | B1 | * | 1/2002 | Juracko | 405/132 |
| 2002/0170240 | A1 | * | 11/2002 | Thompson | 52/36.1 |

FOREIGN PATENT DOCUMENTS

| | | | | |
|---|---|---|---|---|
| DE | 843829 | | 7/1952 | |
| DE | 1059843 | | 6/1959 | |
| GB | 2150171 | * | 6/1985 | 405/288 |

* cited by examiner

Primary Examiner—Jong-Suk (James) Lee
(74) Attorney, Agent, or Firm—Greensfelder, Hemker & Gale, P.C.

(57) ABSTRACT

A frame structure for use as a portable dam. Each frame structure is comprised of a support beam, a base beam and at least one brace beam connected together in pivoting relationship so that the beams may be folded down together for quick assembly and disassembly. The collapsed beams are configured to lie parallel to each other in a folded arrangement to permit efficiency in stacking multiple units together for storage and transportation. The erected frame structures are connected to each other and held in a spaced relationship through the use of couplers that are adapted to slide over the ends of the beams forming the frame structures. The individual frame structures may be erected in place in the water, or a section comprising several connected frame structures may be pre-fabricated and lifted and placed as a unit in the water. A stiffener member is affixed to adjacent frame structures to hold them together in rigid relationship. A foot assembly for providing stability and distribution of the downward pressure caused by the dammed water may be provided with each frame structure.

19 Claims, 4 Drawing Sheets

FRAME MEMBERS FOR A PORTABLE DAM

BACKGROUND OF THE INVENTION

The present invention is broadly concerned with cofferdams for use in temporarily holding back a body of water when performing construction, repairs or bank stabilization in the bed of a river or a lake or any body of water, and also on dry land for flood protection. Such cofferdams are typically constructed of a framework of individual frame structures placed in adjacent alignment along a portion of the body of water which is to be held back. A flexible waterproof fabric is secured along the framework for holding back the water so that work may be performed in the area behind the framework. Given the substantial hydrostatic pressure created in holding back a large volume of water, the frame structures must be extremely sturdy. They are typically formed of steel or iron stock and have a triangular configuration which is best suited for bearing the pressure load. These cofferdams are constructed so that they may be quickly erected and disassembled. Portable dams of this type are well known to those having skill in the art.

Because of the need for quick assembly and disassembly of the portable dam, it is critical that the individual frame structures be configured not only for ease in erecting, but also ease and efficiency in transporting. Frequently, portable dams must be erected as quickly as possible, especially during emergency conditions, so it is important that the individual frame structures be connected in a manner to permit this. Current modes of connection include clamps which must be bolted directly to the frame structures, and stakes which must be driven into the ground as well as bolted to the frame structure. A substantial amount of time is invested in bolting on these clamps. Additionally, because of the large number of individual frame structures required in constructing a length of cofferdam, it is desirable to maximize the number of frame structures that can be stacked on a truck or trailer that transports the frame structures. Generally, individual frame structures are integral pieces and are fixed in their triangular configuration, which is not particularly conducive to efficient stacking. Accordingly, several truck load trips must usually be made to bring a sufficient number of frame structures to the cofferdam construction site.

A further problem faced by erectors of portable cofferdams lies in being able to place the framework down in a stable position in the bed of the body of water to be held back. There is a tremendous pressure placed on the frame structures from the body of water that is held back. Frequently, the river bed is uneven or rocky, which creates stability problems by causing the continuity of the framework to be disrupted. Weak points in the framework caused by such a disruption could allow the cofferdam to collapse, leading to disastrous results.

Accordingly, there is a need in the art for frame structures for use in a portable dam that are adapted for quick assembly and disassembly in erecting the dam with minimal amount of set up time or expenditure of manpower. Additionally, it is desirable that such frame structures be configured for efficient transportation and storage.

Further, there is a need for frame structures of a portable dam that provide stabilization for supporting large hydrostatic pressures and that are adapted to adjust to uneven terrain on which the dam is erected so that stability of the dam can be maintained.

SUMMARY OF THE INVENTION

The invention provides for frame structures for forming a framework used in temporary portable cofferdams. The frame structures are aligned and connected adjacently to each other to form the framework for supporting the waterproof fabric material which holds back the water.

It is an object of the invention to provide a frame structure for use with a portable dam wherein said frame structure is capable of quick assembly and disassembly for ease in erection, transportation and storage. The frame structure is comprised of a support beam, a base beam and at least one brace beam. The connection of the beams is configured to impart a triangular shape to the frame structure, with the support beam being disposed at an angle transverse to the vertical plane of the water which is to be dammed, the base beam being disposed horizontally and lying essentially parallel to the bed of the body of water, and the brace beam having one end connected to the base beam and the other end being connected to the support beam for providing support thereto. The beams are removably connected to each other in a pivoting relationship such that the beams can be swung down to lie parallel to each other into a folded arrangement.

It is another object of the invention to provide coupling members for quickly connecting and disconnecting adjacent frame structures when constructing and disassembling the portable dam framework. The coupling members comprise an elongated bar having ring openings at both ends which are adapted to receive the ends of the beams of the frame structures. This allows workers to quickly place and secure frame structures in adjacent alignment merely by placing the coupling members over the beam ends of the frame structures. The coupling member maintains the adjacent frame structures in a fixed, spaced-apart relationship without the need for clamps requiring bolting.

It is a further object of the invention to permit the joining of a plurality of frame structures rigidly together to form a pre-fabricated portable dam frame section which can be erected as a unit prior to placement in the water to increase the efficiency in building the entire dam. A number of frame structures are adapted to be fixedly held together as a section through the use of one or more stiffening members so they may lifted and placed as a unit in the water. This helps decrease the time spent in the water in erecting the portable dam and makes the overall operation more efficient.

It is a further object of the invention to provide a foot assembly for portable dam frame structures which provide a stable support for the frame structure on the bed of the water body being dammed. The foot assembly allows the weight placed on the frame structure to be distributed along its point of contact with the ground surface, and prevents the frame structure from sinking too deeply into soft bottom beds. The foot assembly is comprised of one or more flat, planar base support members. Each foot support member has a bracket for receiving the frame structure. The foot support members are adjustable and can be moved along the bottom of the frame structure as needed to achieve stability.

The above features are objects of this invention. Further objects will appear in the detailed description which follows and will be otherwise apparent to those skilled in the art.

For purpose of illustration of this invention preferred embodiments are shown and described hereinbelow in the accompanying drawing. It is to be understood that this is for the purpose of example only and that the invention is not limited thereto.

DESCRIPTION OF THE INVENTION

Figure 1:
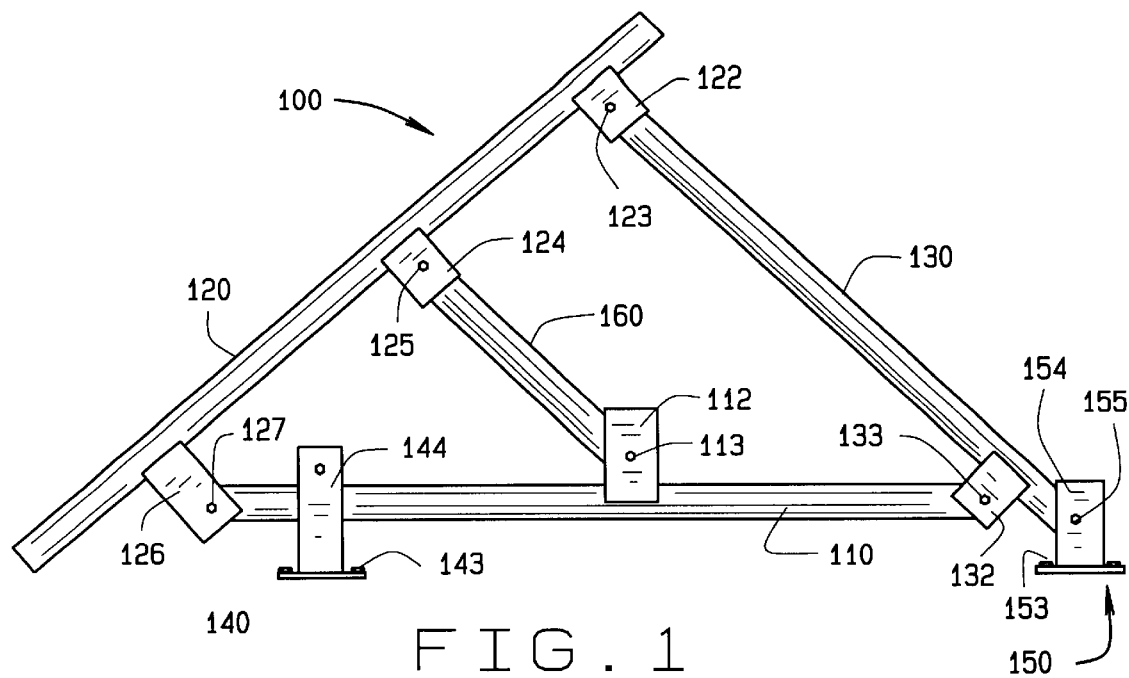
FIG. 1 is a view in side elevation of the frame structure of the present invention.

Referring to FIG. 1, a preferred embodiment of a frame structure 100 in an erected position in accordance with the present invention is shown for use in a temporary dam. Frame structure 100 comprises a base beam 110, a support beam 120, at least one brace beam 130, and a foot assembly comprising foot members 140 and 150. An additional brace beam 160 may be employed for additional stability. The beams are connected to each other through a series of brackets allowing for pivotal movement of the beams with respect to each other. The beams are preferably constructed of hollow cylindrical steel tubing with an outside diameter of about four inches, having a tensile strength of around 60,000 pounds. Depending upon the particular job and body of water to be held back, the beams may have a diameter falling within the range of about two-and-a-half to five inches. Support beam 120 has a pair of bracket plates 122 near its upper end portion, and a pair of bracket plates 126 near its lower end portion, respectively. Brace beam 130 has a pair of bracket plates 132 near its lower end portion. When additional brace beam 160 is employed, base beam 110 is provided with a pair of bracket plates 112 around at its mid-portion and support beam 120 similarly has a pair of bracket plates 124 placed around its mid-portion. One end of base beam 110 is connected to the bracket plates 132 of brace beam 130 by a connector 133 at the "heel" end of the frame structure. The other end of base beam 110 is connected to the bracket plates 126 of support beam 120 by a connector 127 at the "toe" end of the frame structure. One end of brace beam 130 is connected to the bracket plates 122 of support beam 120 by a connector 123. The other end of brace beam 130 is connected to a pair of attachment bracket plates 154 of foot member 150 by a connector 155. When in use, one end of brace beam 160 is connected to the bracket plates 112 of base beam 110 by a connector 113, while the other end of brace beam 160 is connected to the bracket plates 124 of support beam 120 by a connector 125. All the bracket plates 112, 122, 124, 126, and 132 are attached to their respective beams by appropriate known methods such as welding, bolts and nuts or the like. The bracket plates and beam members are provided with corresponding apertures which receive the connectors, allowing for a pivotal relationship between the beam members at their respective points of connection. The connectors 113, 123, 125, 127, 133, and 155 are, but not limited to, for example, a 7/8 inch diameter hinge pin, locking pin or a bolt and nut member. All the connections are pivotal and removable in each of the connection points. The size of the erected frame structure may be varied as desired. Depending upon the body of water to be held back, preferable heights for the structure are eight and twelve feet high, although an acceptable height range falls between three to fifteen feet.

Referring further to FIG. 1, a foot assembly comprised of one or more foot members 140 is used to support frame structure 100 and enable it to be stabilized on a supporting surface such as the ground or concrete. Base beam 110 is received by one or more foot members 140 which can be placed at various points along its length. The supporting surface on which frame structures 100 are placed may be the ground or concrete, which can comprise uneven or rocky terrain. Frequently, the bed of the body of water is very silty or sandy. Such a surface makes it difficult to stabilize the dam's frame structure because of the large downward pressure placed on the frame by the weight of the body of water held back. The foot assembly allows that downward pressure to be distributed over the flat planar base of the foot members, resulting in greater stability as the frame structure settles on the surface. As further shown in FIG. 1, a foot member 150 may be provided at the heel end of the frame structure to prevent backwards slippage when downward pressure of the dammed water is applied. Similarly, a foot member may be attached to the toe end of frame structure 100. The foot members are optimally configured of a pair of bracket plates between which are received the beam members. The foot members may be anchored to the supporting surface to secure frame structure 100 by a plurality of anchoring members 143 and 153, respectively. It may be desirable to use additional foot members as the condition of the supporting surface dictates. In an alternative embodiment of the present invention, the foot members may not be used. In that case, the ends of support beam 120 and brace beam 130 are placed directly on the supporting surface. It should be understood that various combinations of connection methods using foot members 140 and 150 shown in FIG. 1 can be contemplated other than the connection method described above, such as by providing corresponding and aligning holes in base beam 110 and the foot assembly so that they may be joined by bolting.

Figure 2:
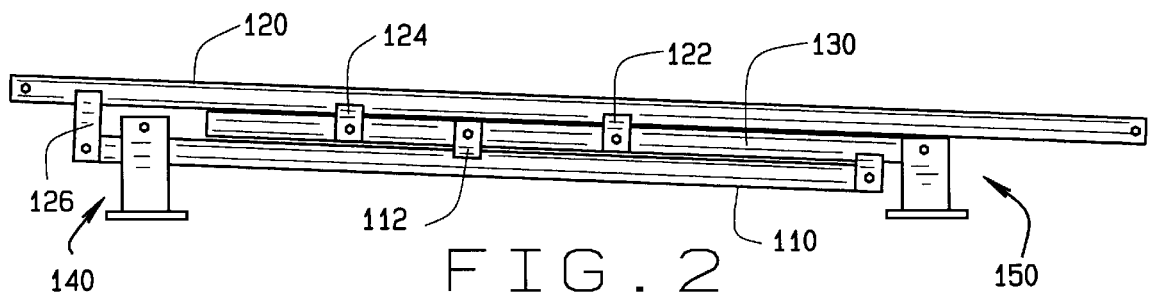
FIG. 2 is a view in side elevation of the frame structure in which the beam members have been folded down onto each other.

Now referring to FIG. 2, a preferred embodiment of a frame structure 100 in a collapsed position in accordance with the present invention is shown. To convert frame structure 100 from an erected position as shown in FIG. 1 into a collapsed position as shown in FIG. 2, both ends of brace beam 160 in FIG. 1 (if brace beam 160 is used) are disconnected from base beam 110 and support beam 120 by removing connectors 113 and 125. Brace beam 160 can then be separately stored for transportation, storage, and later use. Next, one end of brace beam 130 is disassembled from the connection to support beam 120 by removing connector 123. Then, brace beam 130 is folded down onto base beam 110 by pivotal rotation about its point of connection to base beam 110 through bracket 132. Similarly, support beam 120 is then folded down onto brace beam 130 by pivotal rotation about its point of connection to base beam 110 through bracket 126. Bracket plates 126 should have a longer height than the height of bracket plates 112, 122, 124, and 132 for providing a substantial parallel, nestled alignment relationship of support beam 120 with base beam 110 and brace beam 130. Preferably, the height of bracket of bracket plate 126 is about double the height of bracket plates 112, 122, 124, and 132 to provide sufficient clearance so that brace beam 130 may lie cradled between support beam 120 and base beam 110. As those skilled in the art can understand from FIG. 2, connections of the beams made between bracket plates 126 of support beam 120 and bracket plates 132 of brace beam 130 as well as the connections of base beam 110 to foot members 140 and 150 through attachment bracket plates 144 and 154 need not be disassembled from each other in the transportation and storage mode. This ability to pivot the beams down on themselves without disassembling all the connections allows frame structure 100 to occupy minimal space in a collapsed mode for transportation and storage purposes. This pivoting beam feature also allows frame structure 100 to be capable of quick assembly and ease in re-erection at the construction site. Further advantages are provided by the bracket plates of frame structure 100. Bracket plates 112, 122 and 124 help to confine the collapsed beams in a vertically stacked position so that lateral movement of the beams with respect to each other is prevented. This allows frame structure 100 to be handled with more ease and safety during transportation. Foot assemblies 140 and 150 may also remain connected to base beam 110 and brace beam 130, respectively. This provides additional stability to the collapsed frame structure 100 as it lies in a stored position.

Figure 3:
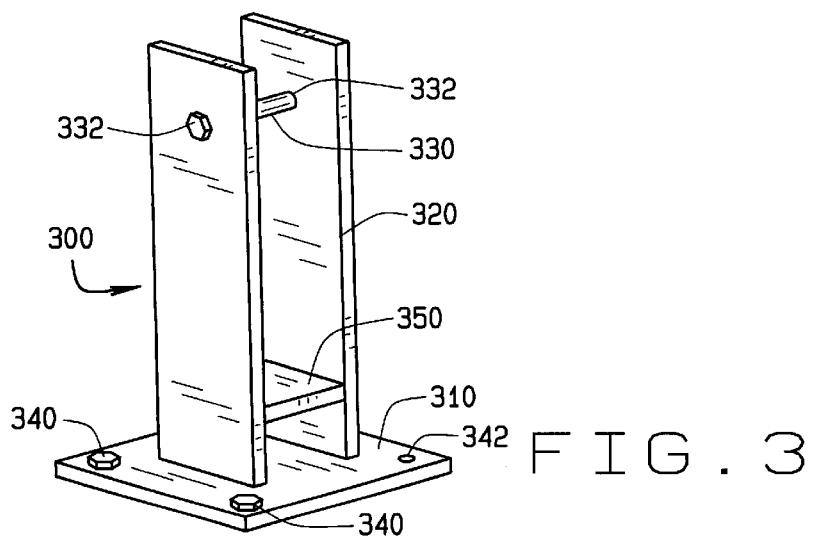
FIG. 3 is a perspective view of a foot assembly for use with the frame structure.

Referring to FIG. 3 of the present invention, a foot member 300 of the present invention is shown. Foot member 300 is the same as or similar to each of foot members 140 as shown in FIG. 1. Foot member 300 comprises a flat planar base support member 310 and a pair of attachment bracket members 320. Each side of attachment bracket members 320 is provided with an aperture 332. Connector 330 is used for retaining a beam member of frame structure 110 within and between the brackets 320 of the foot member in supporting relationship. Foot member 300 may be further provided with a support plate 350 disposed below apertures 332 for supporting base beam 110. Base beam 110 is confined in a space formed between attachment bracket members 320 and support plate 350. Connector 330 may be passed through apertures 332 to provide a stop so that base beam 110 does not inadvertently become displaced from between the brackets. It is noted that the height between the placement of connector 330 and support plate 350 should approximate the diameter of base beam 110 to avoid excessive play or movement. A plurality of anchoring members 340 are used for anchoring foot member 300 to the supporting surface underneath the erected frame structure. Apertures 342 are formed on flat planar base support member 310 for receiving anchoring members 340. In the preferred embodiment of the present invention, a pin is used as an anchoring member 340. However, those skilled in the art will understand that any kind of anchoring member such as a nail, a metal or wood peg, and a wedge or the like may be used. Foot members 150 are also similar in structure to foot member 300, but in addition, provide apertures for receiving a fastening pin therethrough. These apertures are aligned with corresponding apertures located towards the bottom of brace beam 130 (or support beam 120) so that the respective beam of the heel or toe end of frame structure 100 may be connected to the foot member as shown in FIG. 1.

Figure 4:
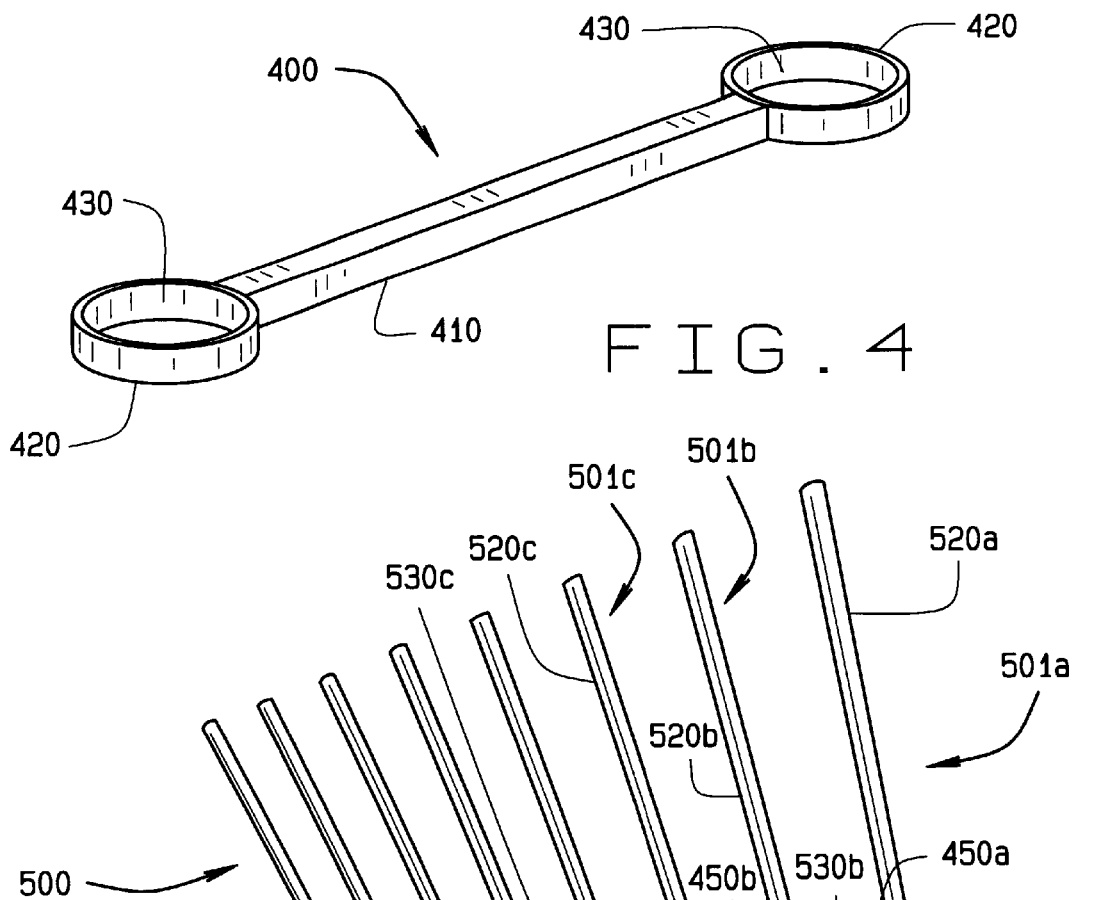
FIG. 4 is a perspective view of a coupler member.

Now referring to FIG. 4, a coupler 400 as contemplated for use in accordance with the present invention is shown. Coupler 400 is used for connecting a plurality of frame structures 100 together in a lateral orientation in setting up a portable or temporary dam. Coupler 400 comprises an elongated steel bar 410 having a pair of collars 420 at opposite ends which define a pair of ring openings 430. Coupler 400 permits a plurality of frame structures 100 to be connected together in adjacent alignment simply by placing collars 420 over upper and lower ends of support beams 120 and brace beams 130 of respective adjacent frame structures 100. The diameter of ring opening 430 is slightly larger than that of the beams so that it can be readily placed over a beam, yet not allow excessive movement of the beam within the ring. Those skilled in the art will understand that the shape of the opening may be adapted to receive various cross sectional shapes of beams if the beams have, for example, a triangular, rectangular, or square cross section, or the like, other than a circular cross section as shown in FIG. 1. A plurality of couplers 400 may be used for the connection of adjacent frame structures. For example, three couplers 400 can be used for the lateral connections of upper and lower ends of support beam 120 and lower end of brace beam 130 of adjacent frame structures. When coupler 400 is placed over the upper ends of support beams 120, they may be held in place merely by gravity. When coupler 400 is placed on the lower ends of brace beam 130 and support beam 120, it can be held in place by a fixing pin or a bolt and nut to prevent disengagement.

Figure 6:
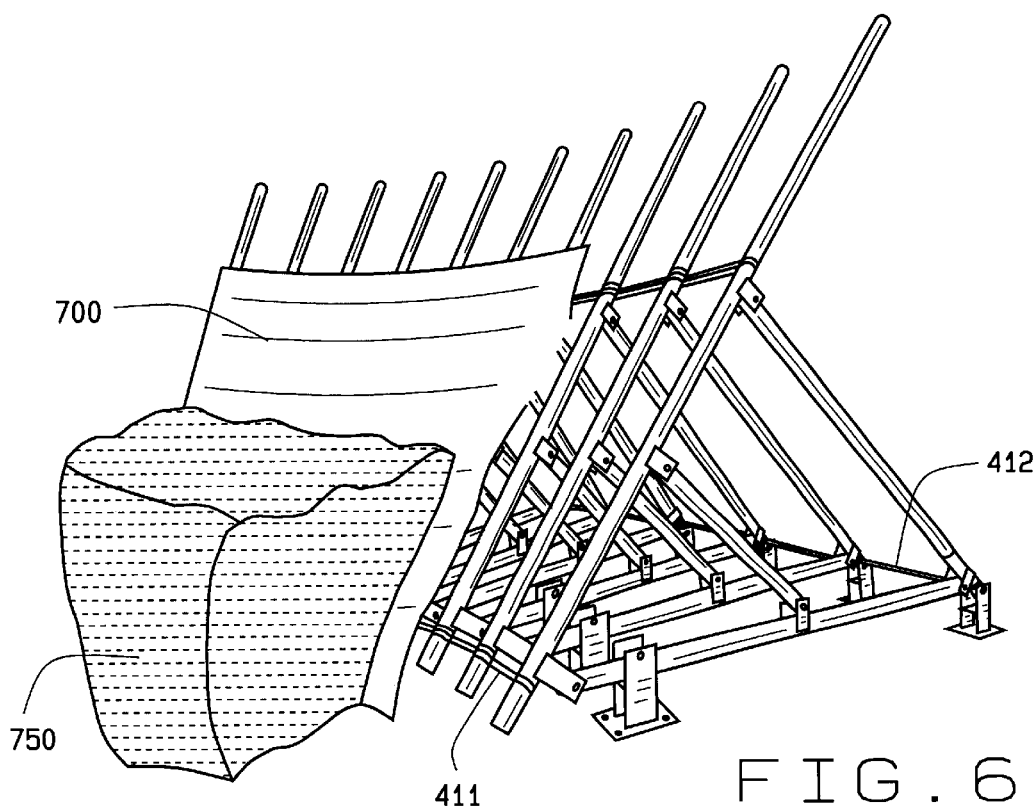
FIG. 6 is a perspective view from the side of a plurality of frame structures of a portable dam erected to create a concave curvature in holding back a body of water.
Figure 7:
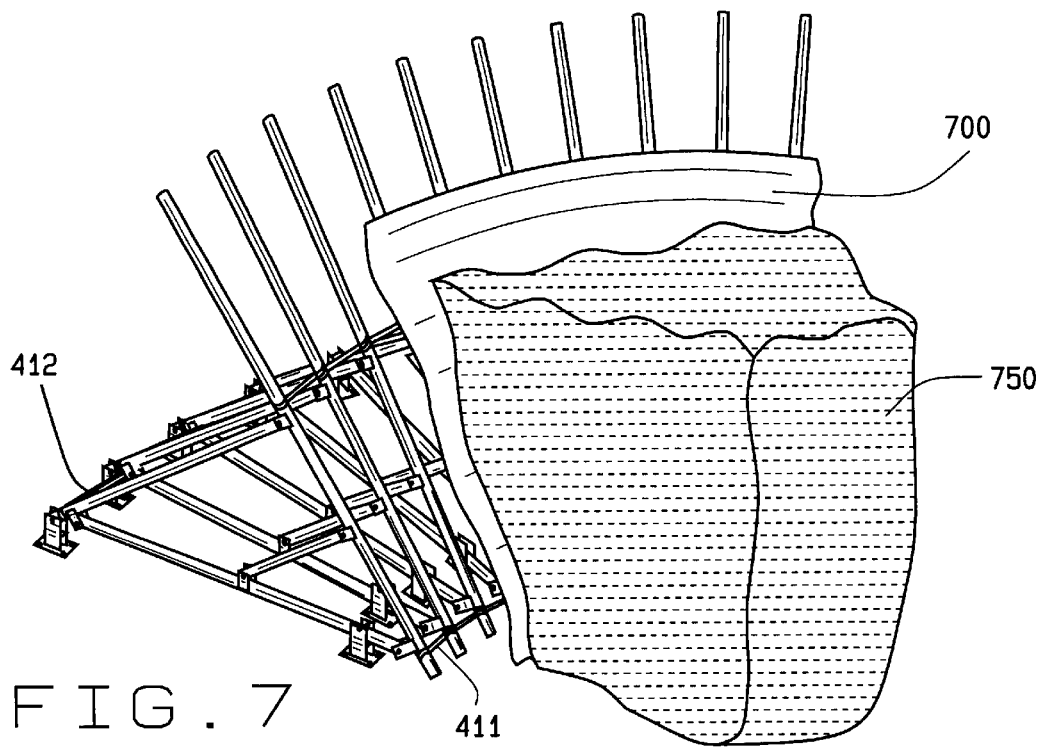
FIG. 7 is a perspective view from the front of a plurality of frame structures of a portable dam erected to create a concave curvature in holding back a body of water.
Figure 8:
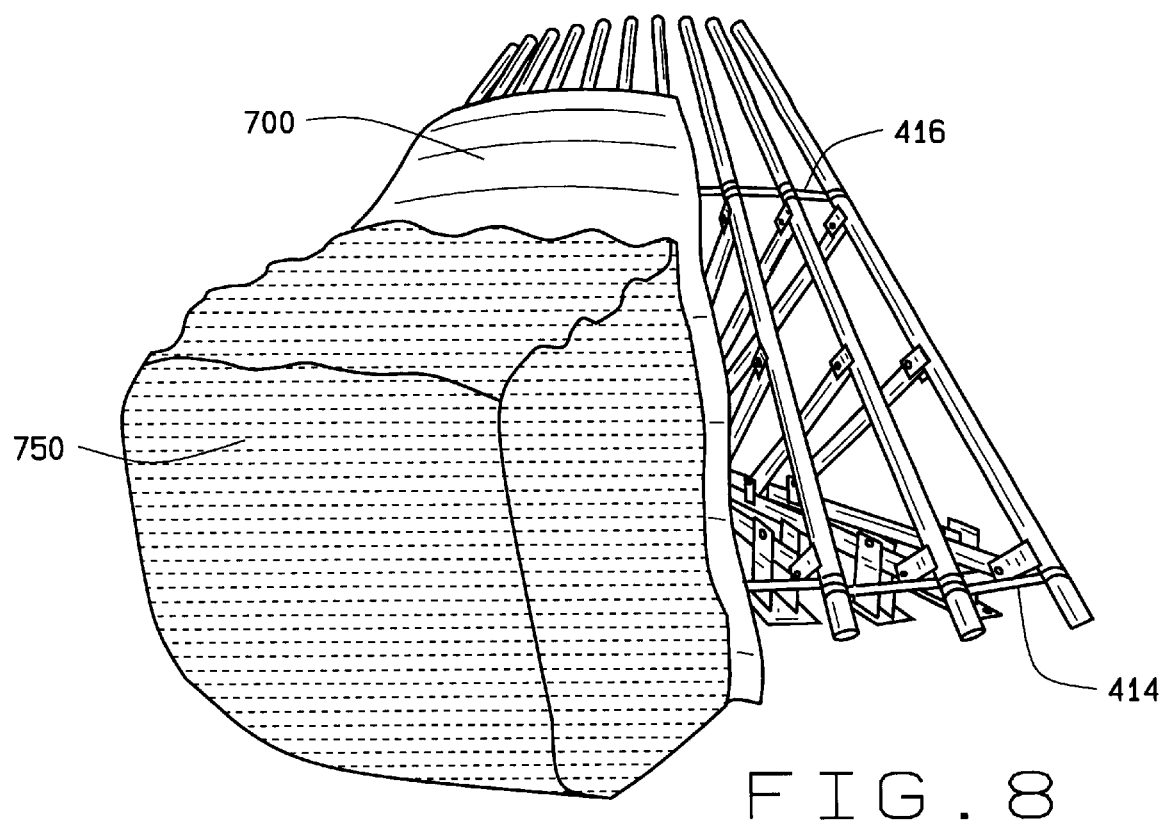
FIG. 8 is a perspective view from the front of a plurality of frame structures of a portable dam erected to create a convex curvature in holding back a body of water.
Figure 9:
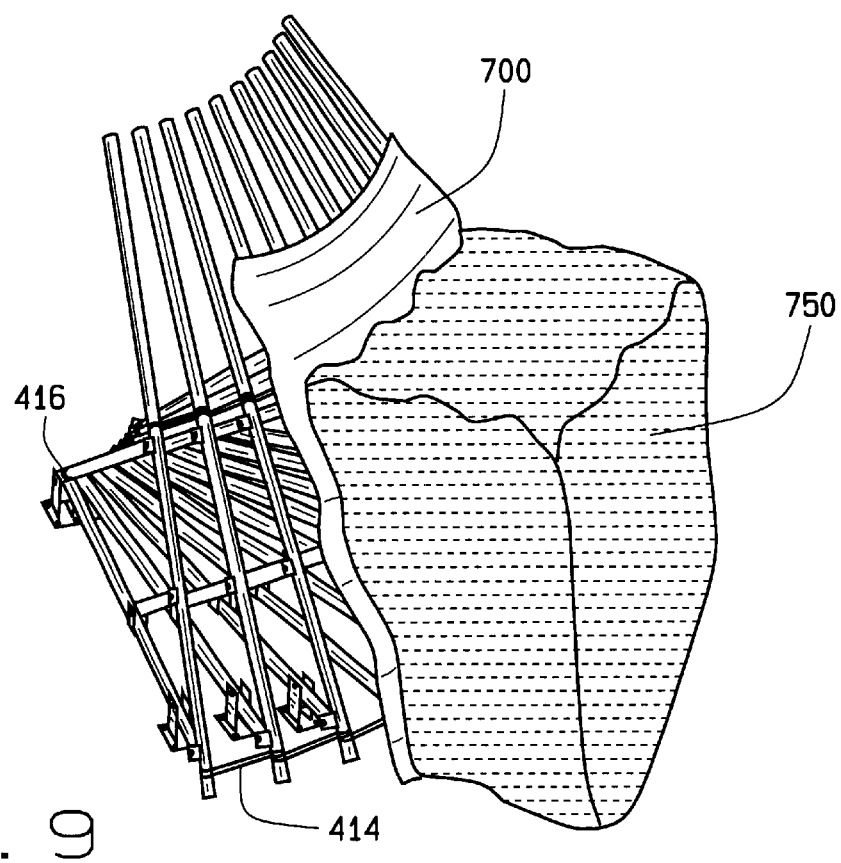
FIG. 9 is another perspective view from the front of a plurality of frame structures of a portable dam erected to create a convex curvature in holding back a body of water.

The length of coupler 400 is designed to be a standard length, such as two and a half feet long, for uniformity in constructing the portable dam. However, couplers may also come in varying lengths depending on the orientation of frame structures 100 in the dam construction in creating the contour of the dam. Depending upon the layout of the construction job, it may be necessary to divert the flow of water 750 around an object. In those cases, the periphery of the erected dam will constructed to approximate either a concave or convex contour. To create such a contour, a plurality of short and long couplers 400 may be used. For example, where a concave contour is desired, the frame structures 100 must be aligned along a curve with the support frames 120 being positioned closer together and the brace frames 130 being splayed out as shown in FIGS. 6 and 7. In this orientation coupler 410 is shorter than coupler 412 to hold the respective beams in the splayed out orientation. Similarly, where a convex contour is desired, as shown in FIGS. 8 and 9, support frames 120 are splayed out and held together by couplers 414 while the brace frames 130 are positioned closer together and held together by couplers 416.

Figure 5:
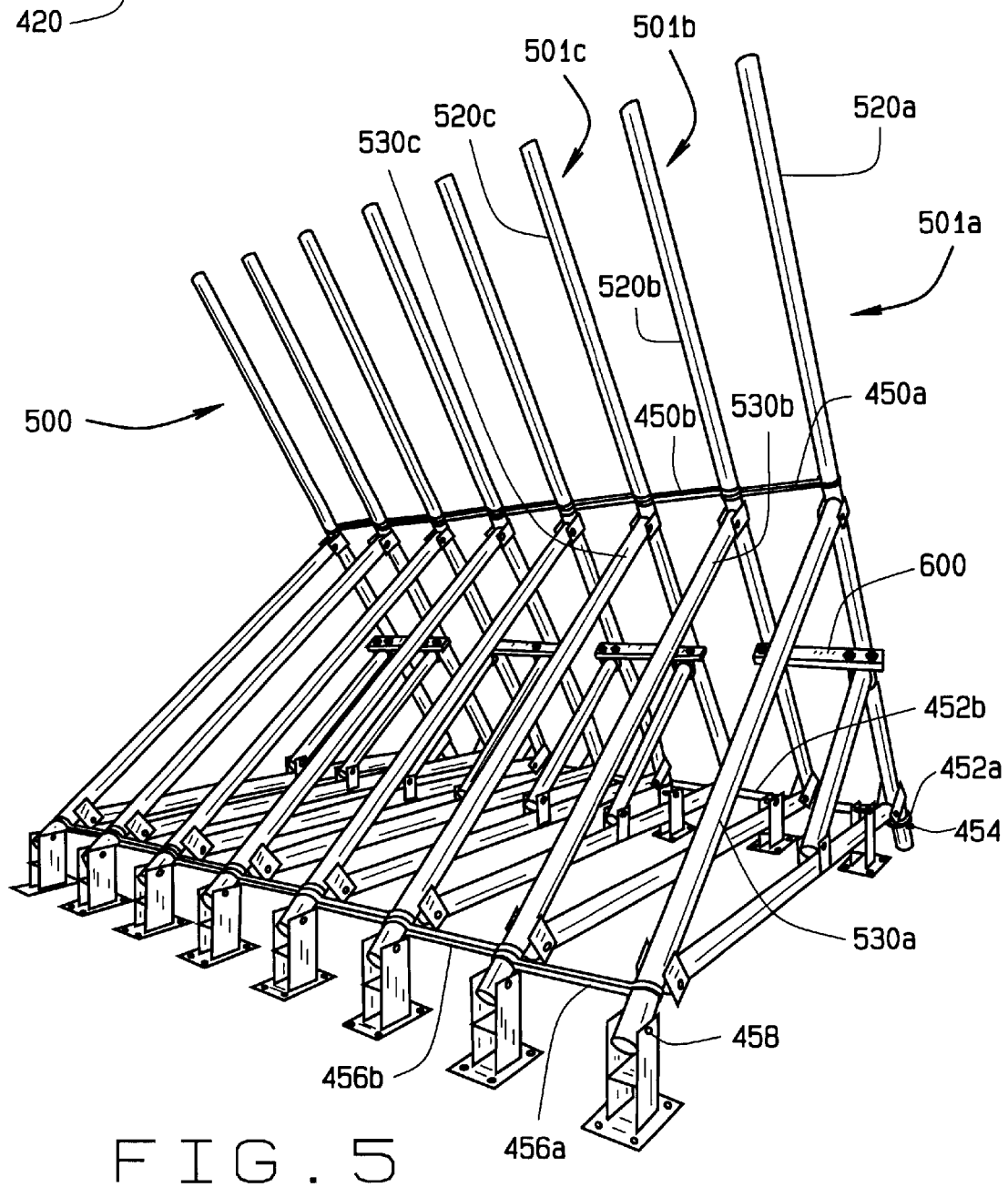
FIG. 5 is a perspective view of a plurality of frame structures erected in preparation to forming a portable dam.

Now referring to FIG. 5, a temporary or portable dam 500 structure in accordance with the present invention is shown in an erected position. Temporary dam 500 comprises a series of respective frame structures 501a, 501b, 501c and so on. Each of these frame structures are basically the same as frame structure 100 as shown in FIG. 1. The general method of the placement and erection temporary dams of this type in a body of water to be dammed is well known to those having skill in the art, and therefore a detailed description of such placement and erection are omitted, except to the extent necessary to explain the invention.

In connecting the frame structures of the invention together to form temporary dam 500, frame structures 501a and 501b are positioned adjacent to each other in similar orientation as required for the contour of the portable dam formed by the flexible, water-retaining fabric 700 that is placed over the frame structures. Frame structures 501a and 501b are held together in a lateral, spaced apart relationship by using coupler bars as described above. As shown in FIG. 5, coupler bar 450a is placed over the upper ends of support beams 520a and 520b. Similarly, coupler bar 452a is placed over the lower ends of support beams 520a and 520b. To hold coupler bar 452a in place and to keep it from falling off the beam ends, holes may be provided through the beam ends for receiving a bolt or pin 454. Further, coupler bar 456a is placed over the lower ends of brace beams 530a and 530b. Likewise, to hold coupler bar 456a in place and to keep it from falling off the beam ends, holes may be provided through the beam ends for receiving a bolt or pin 458. If any foot members of foot assembly 300 are placed on the ends of brace beams 530a and/or 530b, they would be adequate to hold coupler bar 456a in place. Of course, the coupler bars would need to be placed over the lower ends of the brace beams prior to attachment of the foot assemblies. This arrangement is duplicated for each successive adjacent frame structure added as shown in FIG. 5. It may be necessary to place the additional coupler bars 452a and 456a, and also additional coupler bars 452b and 456b, on the lower ends of support beam 520b and brace beam 530b, respectively, prior to attachment of the foot assembly and settlement of frame structure 501b on the supporting surface. In this way, coupler bars 452b and 456b will be ready to receive the lower ends of support beam 520c and brace beam 530c. Thereafter, an additional coupler bar should be placed on the lower end of each beam of each successive frame structure for receiving the next successive frame structure, until the last frame structure forming the temporary dam is reached. Coupler bar 450b is simply placed over the upper ends of support beams 520b and 520c, and additional coupler bars for each successive frame structure until the last frame structure forming the temporary dam is reached. By using the coupler bars of the present invention, the adjacent frame structures are maintained in a fixed, spaced-apart relationship without the need for clamps requiring bolting.

It is frequently desirable, and necessary, to pre-fabricate a section of the portable dam prior to placement in the water. Pre-fabrication allows for erection of the frame structures in section lengths on land which provides advantages over erection in the water. The water in which the portable dam is erected is typically murky and often has a current, offering poor visibility and creating difficult working conditions. Therefore, construction of the dam by joining the frame structures in the water one-by-one may not always be practical. In constructing a number of frame structures for pre-fabrication of a section, connections are made as previously described. The coupler members permit relatively rigid connection between adjacent frame structures, but still allow for some play at the area of connection. So that the joined section may be lifted and placed into position, stiffening members 600, which are comprised lengths of steel bar, are affixed to adjacent frame structures, preferably by bolting as shown in FIG. 5. For optimum rigidity, the stiffening members are connected to each frame structure at the juncture between support beam 120 and brace beam 160. This arrangement provides the necessary rigidity so that the pre-fabricated section may be lifted as a unit and placed directly at the dam site. This section is then connected to other sections in the water using the described coupler members.

Various changes and modifications may be made within this invention as will be apparent to those skilled in the art. Such changes and modifications are within the scope and teaching of this invention as defined in the claims appended hereto.

What is claimed is:

1. In a temporary dam of the type comprising a plurality of frame structures supporting a flexible web material aligned along a body of water to be dammed, the improvement comprising said dam having:
   a) individual frame structures each comprising a support beam, a base beam and at least one brace beam,
   b) a foot assembly, and
   c) coupler members, said beams being removably connectable to each other to enable said frame structure to be collapsible between an erected position and a collapsed position, said foot assembly comprising a plurality of foot members removably connected to a bottom of one or more of said frame structures said foot members being adapted for connection at any position along said bottom of said frame structure, said foot members being adapted to support said frame structure on a supporting surface, said coupler members comprising a rigid, elongated bar member having collars at opposing ends, said collars being adapted to be removably placed over ends of beam members forming said frame structures, whereby said coupler members maintain adjacent frame structures in a fixed, spaced apart relationship.

2. The temporary dam of claim 1 in which at least two respective points of connection between said beams in each frame structure are pivotable, whereby said frame structure is adapted to fold down into said collapsed position while said support beam and said brace beam remain attached to said base beam.

3. The temporary dam of claim 2 in which each point of connection for joining a respective first and second beam comprises laterally extending bracket plates disposed on said first beam, holes being defined in said bracket plates for receiving a connector therethrough, an end of said second beam defining apertures and being adapted to engage said bracket plates, said holes and said apertures being adapted for alignment to receive said connector therethrough to effect a joining relationship between said first and said second beam, whereby said beams are pivotable with respect to each other about said connector.

4. The temporary dam of claim 3 in which said beams are adapted to collapse to a folded position in which said beams lie parallel and adjacent to each other, a length of each of said bracket plates being at least as long as a diameter of an adjacently lying beam, whereby beams positioned above respectively adjacent beams are adapted to cradle within said bracket plates of said adjacent beams.

5. The temporary dam of claim 1 in which said collars lie loosely over said ends of said beam members and are fixedly unattached thereto, said collars being adapted for quickly connecting and disconnecting said frame structures together.

6. The temporary dam of claim 1 in which a stiffener member is provided for connecting adjacent frame structures in a rigid, fixed relationship.

7. The temporary dam of claim 1 in which each of said foot members comprises a flat planar base support member and attachment bracket for receiving a portion of said frame structure in supporting relationship.

8. The temporary dam of claim 7 in which said planar base support member of each foot member has at least one aperture disposed therein for receiving an anchoring member, whereby said base support member is adapted to be anchored to said supporting surface for stability.

9. A structure for use in a temporary dam of the type comprising a plurality of frame structures supporting a flexible web material aligned along a body of water to be dammed, each of said frame structures comprising:
   a support beam,
   a base beam,
   at least one brace beam, and
   a foot assembly,
said beams being removably connectable to each other in an erected position to form said frame structure, said support beam, said base beam, and said at least one brace beam of said erected frame structure lying in a common plane, said frame structure being collapsible between said erected position and a collapsed position, said foot assembly comprising a plurality of foot members connected to a bottom of said frame structure, said foot members being adapted for connection at any position along said bottom of said frame structure, said foot members being adapted to support said frame structure on a supporting surface.

10. The structure of claim 9 in which each of said foot members comprises a flat planar base support member and attachment bracket for receiving a portion of said frame structure in supporting relationship.

11. The structure of claim 10 in which said planar base support member of each foot member has at least one aperture disposed therein for receiving an anchoring member, whereby said base support member is adapted to be anchored to said supporting surface for stability.

12. The structure of claim 9 in which at least two respective points of connection between said beams are pivotable, whereby said frame structure is adapted to fold down into said collapsed position while said support beam and said brace beam remain attached to said base beam.

13. The structure of claim 12 in which each point of connection for joining a respective first and second beam comprises laterally extending bracket plates disposed on said first beam, holes being defined in said bracket plates for receiving a connector therethrough, an end of said second beam defining apertures and being adapted to engage said bracket plates, said holes and said apertures being adapted for alignment to receive said connector therethrough to effect a joining relationship between said first and said second beam, whereby said beams are pivotable with respect to each other about said connector.

14. The structure of claim 13 in which said beams are adapted to collapse to a folded position in which said beams lie parallel and adjacent to each other, a length of each of said bracket plates being at least as long as a diameter of an adjacently lying beam, whereby beams positioned above respectively adjacent beams are adapted to cradle within said bracket plates of said adjacent beams.

15. A foot assembly adapted for use with a frame structure used in a temporary dam of the type comprising a plurality of frame structures supporting a flexible web material aligned along a body of water to be dammed, said foot assembly comprising at least one foot member removably connected to a bottom of said frame structure, said foot member being adapted for connection at any position along said bottom of said frame structure, said foot member comprising a flat planar base support member and attachment bracket members for receiving a portion of said frame structure in supporting relationship, said foot member being adapted to support said frame structure on a supporting surface.

16. The foot assembly of claim 15 in which a plurality of foot members are provided for supporting said frame structure.

17. The foot assembly of claim 15 in which said planar base support member has at least one aperture disposed therein for receiving an anchoring member, whereby said base support member is adapted to be anchored to said supporting surface for stability.

18. A coupler member adapted for use with a frame structure used in a temporary dam of the type comprising a plurality of frame structures supporting a flexible web material aligned along a body of water to be dammed, said coupler member comprising an a rigid, elongated bar member having collars at opposing ends, said collars being adapted to be removably placed over ends of beam members forming said frame structures, said coupler member having a sufficient length to maintain adjacent frame structures in a fixed, spaced apart relationship.

19. The coupler member of claim 18 in which said collars lie loosely over said ends of said beam members and are fixedly unattached thereto, said collars being adapted for quickly connecting and disconnecting said frame structures together.

* * * * *